US009743436B1

(12) United States Patent
Bradish

(10) Patent No.: US 9,743,436 B1
(45) Date of Patent: Aug. 22, 2017

(54) METHODS AND APPARATUS FOR REGISTERING NETWORK IDENTIFIERS AND/OR TAKING DIFFERENT ACTIONS BASED ON THE TYPE OF NETWORK IDENTIFIER BEING REGISTERED OR REPORTED

(71) Applicant: WIRELESS REGISTRY, INC., Washington, DC (US)

(72) Inventor: Stillman Bradish, Washington, DC (US)

(73) Assignee: GBL Systems Corporation, Camarillo, CA (US)

( * ) Notice: Subject to any disclaimer, the term of this patent is extended or adjusted under 35 U.S.C. 154(b) by 0 days.

(21) Appl. No.: 14/620,590

(22) Filed: Feb. 12, 2015

Related U.S. Application Data

(60) Provisional application No. 61/939,032, filed on Feb. 12, 2014.

(51) Int. Cl.
| | |
|---|---|
| G06F 17/30 | (2006.01) |
| H04W 76/02 | (2009.01) |
| H04W 8/26 | (2009.01) |
| H04W 60/00 | (2009.01) |
| H04W 48/00 | (2009.01) |
| H04W 48/18 | (2009.01) |
| H04W 48/12 | (2009.01) |

(52) U.S. Cl.
CPC .......... *H04W 76/021* (2013.01); *H04W 8/26* (2013.01); *H04W 48/12* (2013.01); *H04W 48/17* (2013.01); *H04W 48/18* (2013.01); *H04W 60/00* (2013.01)

(58) Field of Classification Search
CPC ........ H04W 48/17; H04W 8/18; H04W 8/005
See application file for complete search history.

(56) References Cited

U.S. PATENT DOCUMENTS

| | | | |
|---|---|---|---|
| 2007/0081477 A1* | 4/2007 | Jakkahalli | ........... H04L 12/4645 370/310 |
| 2008/0130595 A1* | 6/2008 | Abdel-Kader | ........ H04W 48/00 370/338 |
| 2009/0011743 A1 | 1/2009 | Johanson et al. | |

(Continued)

*Primary Examiner* — Ian N Moore
*Assistant Examiner* — Mewale Ambaye
(74) *Attorney, Agent, or Firm* — Michael P. Straub; Stephen T. Straub; Ronald P. Straub

(57) ABSTRACT

The present disclosure describes systems and methods for providing differentiated actions associated with predetermined types of SSIDs, as determined by a registry computing service. Embodiments include registry databases, SSID transmitters, and WED's connected through the cloud, having a hardware configuration suitable for communicating wirelessly. Hardware of the registry service may execute any number of modules, including SSID Databases, Parsing Modules, Registration Modules, and Query Handling Modules, among others. Suitable SSID databases may store a set of SSIDs, SSID types, and SSID substrings associated with the SSID types. Methods described here include registration processes and processes for providing a WED differentiated actions associated with an SSID. If the registry determines that the SSID matches an SSID in the SSID database, the WED and SSID transmitter may take actions associated with the SSID. Otherwise, the WED and SSID transmitter may take actions defined to be the default actions for an SSID.

9 Claims, 5 Drawing Sheets

(56) References Cited

U.S. PATENT DOCUMENTS

| | | | |
|---|---|---|---|
| 2009/0279492 A1* | 11/2009 | Montemurro | H04L 63/083 370/329 |
| 2011/0047603 A1* | 2/2011 | Gordon | H04L 63/06 726/5 |
| 2013/0124309 A1 | 5/2013 | Traasdahl et al. | |
| 2013/0128811 A1 | 5/2013 | Bradish et al. | |
| 2014/0181245 A1 | 6/2014 | Richardson et al. | |
| 2014/0194153 A1 | 7/2014 | Salkintzis | |

* cited by examiner

METHODS AND APPARATUS FOR REGISTERING NETWORK IDENTIFIERS AND/OR TAKING DIFFERENT ACTIONS BASED ON THE TYPE OF NETWORK IDENTIFIER BEING REGISTERED OR REPORTED

CROSS-REFERENCE TO RELATED APPLICATION

This is non-provisional patent application claims priority to U.S. Provisional Patent Application No. 61/939,032, entitled "Wireless Registry as an Address Book for Registering and Classifying WiFi Names," filed Feb. 12, 2014, which is incorporated by reference herein in its entirety.

This application is related to U.S. patent application Ser. No. 14/610,250, entitled "Methods and Systems for Managing IDs in WNS Using API," filed Jan. 30, 2015; U.S. patent application Ser. No. 14/603,876, entitled "Wireless Registry as a Broker Platform," filed Jan. 23, 2015; U.S. patent application Ser. No. 14/610,102, entitled "Systems and Methods for Creating Pattern Awareness and Proximal Deduction of Wireless Devices," filed Jan. 30, 2015; and U.S. patent application Ser. No. 14/614,723, entitled "Systems and Methods for Associating User Personal Information with Wireless Enabled Devices," filed Feb. 5, 2015. Each of the above-cited patent applications are incorporated herein in their entireties.

TECHNICAL FIELD

The present disclosure relates in general to wireless services, and more specifically to methods for providing differentiated actions associated with types of SSIDs.

BACKGROUND

Wireless Enabled Devices (WEDs) have seen increasingly widespread use in recent years as consumers have shown a growing interest in accessing content wirelessly. Consumers may use phones, tablets, laptops, and many other devices in a variety of environments and situations, and as the number of users may grow so may the challenges faced in providing a suitable service to each user.

Wireless communications generally present a user a string as a network identifier, but may often be generic factory defined SSIDs. Additionally, SSID strings may be misleading, or may falsely seem to indicate a relationship with an entity. This may hinder users attempting to make use of these networks, or may be used for fraudulent activities.

The aforementioned challenges, amongst others, may hinder the effective use of WEDs. There is, then, a continuing need for networking systems and strategies able to provide solutions to one or more of these challenges.

SUMMARY

The present disclosure describes systems and methods for providing differentiated actions associated with predetermined types of SSIDs, as determined with a registry.

In one embodiment, a computer-implemented method comprises receiving, by a computer hosting a registry computing service, from a client device a registration request containing a network identifier of a wireless network, wherein the network identifier indicates a network classification type for the wireless network; storing, by the computer, the network identifier into a wireless registry database that stores one or more records of one or more network identifiers, in response to the computer determining that the network identifier does not match a second identifier of a second record in the registry database; receiving, by the computer, a query containing the wireless identifier from a second client device connected to the network associated with the wireless identifier; and executing, by the computer, a predetermined action based on the network classification type of the network, in response to determining the network information type stored in the record of the network identifier.

In another embodiment, a computer-implemented method comprises receiving, by a wireless computing device, one or more network identifiers associated with one or more wireless networks respectively; connecting, by the wireless computing device, to a network based on a selection received from a user interface; identifying, by the wireless computing device, a network classification of the network based on a predetermined string contained in the network identifier; and automatically transmitting, by the wireless computing device, to a wireless registry server a predetermined set of data associated with the network classification of the network in response to identifying the network classification.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
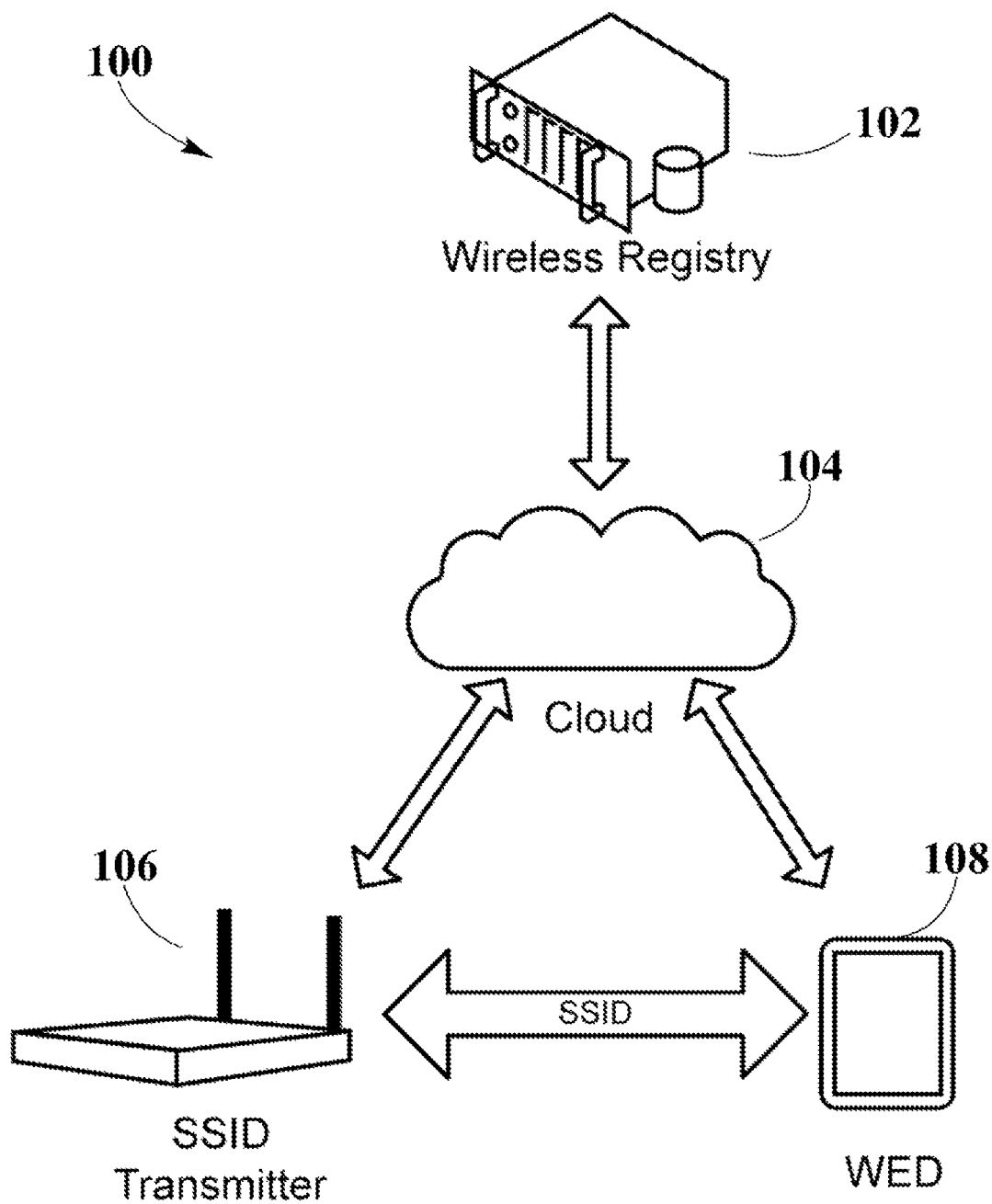
FIG. 1 shows a system architecture, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

As used here, the following terms may have the following definitions:

"Registry," or "Wireless Registry," refers to any component in a system suitable for storing at least one type of information about one or more other components of the system and/or one or more users of the system.

"Wireless Enabled Device," or "WED" refers to any electronic device able to communicate using one or more suitable wireless technologies. Suitable devices may include client devices in wireless networks, which may send out wireless probe signals in order to detect known Access Points. These may be part of one or more suitable wireless technologies, including Wi-Fi, amongst many others.

"Access Point" refers to any device capable of establishing a connection between one or more suitable WEDs within a suitable spatial range and one or more suitable networks.

"Service Set Identifier," or "SSID" refers to any identifier suitable for allowing the identification of a wireless network.

"SSID Type" refers to an SSID string pattern defined to have a meaning within a registry.

"Authorized Device Specific SSID," or "ADSS" refers to any SSID associated with at least one WED authorized for use as a virtual access point.

"Access Point Manager" refers to any component in a system able to coordinate actions taken by one or more access points.

"Region" refers to one or more defined geographic area belonging to a group of defined geographic areas.

The present disclosure describes systems and methods for providing differentiated actions associated with predetermined types of SSIDs, as determined with a registry computing service. The registry computing service may be a cloud-based wireless identifier registration system that stores data associated with wireless identifiers into registry databases. Registry databases may contain records of wireless identifiers having data fields that contain various types of data, such as user information, device information, commands or instructions for devices to execute, among other types data.

Although the embodiments described herein make reference to Wi-Fi (802.11) communication protocols and information exchanges, it should be appreciated that in other embodiments any wireless communication technology (i.e., hardware, software, and protocols) may be implemented. Suitable access point hardware may be able to broadcast multiple network information strings, where each network information string may be either publicly broadcast or may be hidden. Multiple network information strings being broadcast by one or more access points may form one or more virtual access points (VAPs) perceivable by WEDs in range of the access point. If the network information string of the VAP and its associated credentials may match an network information string and a credential-pair that was previously stored by the WED, the WED may attempt to establish a connection to the VAP. The access point may use a wireless signal or technology of any type, such as virtual local area network (VLAN), Bluetooth, Wi-Fi, WiMax, SuperWiFi, LTE systems, LTE Direct, Wi-Fi Direct, or any other wireless signal or technology. Wireless technologies involved in this applications may be any technology that may wirelessly transmit name strings and wirelessly transmit wireless IDs of any kind (e.g., LTE Direct Expressions and LTE, Universal Unique Identifier (UUID), Hardware ID, SSID and MAC). A person having ordinary skill in the art would appreciate that the terms SSID and MAC, as used herein, may be understood as including other wireless technologies (e.g., Bluetooth® names, LTE-Direct Expressions, etc.). Likewise, suitable WED hardware may be able to use a wireless signal or technology of any type, such as Bluetooth®, Wi-Fi, WiMax, SuperWiFi, LTE systems, LTE Direct, Wi-Fi Direct, or any other wireless signal or technology. Wireless technologies involved in this applications may be any technology that may wirelessly transmit name strings and wirelessly transmit wireless IDs of any kind (e.g., LTE Direct Expressions and LTE Hardware ID, SSID and MAC).

In one or more embodiments, systems and methods for providing differentiated actions associated with predetermined types of SSID's may include any suitable number of registries, SSID transmitters, and WED's connected through the cloud. In one or more embodiments, the registries, SSID transmitters, and WED's may be computing devices with a hardware configuration suitable for communicating through a suitable wireless technology, including WiFi, Bluetooth, or LTE Direct, amongst others.

In one or more embodiments, suitable registry hardware configurations may run any number of suitable modules, and may include one or more processors, ram units, wireless communication radios, and physical storage, amongst others. Registries may include any number of software modules, including SSID Databases, Parsing Modules, Registration Modules, and Query Handling Modules, amongst others. Suitable SSID databases may be able to store a set of SSIDs, SSID types, and SSID substrings associated with the SSID types.

In one or more embodiments, suitable WEDs may include an interactive display where one or more SSID's may be displayed and one or more SSID's may be selected.

In one or more embodiments, registration processes may begin with a registration request. The SSID may then be parsed, and may be matched to an SSID type in a registry. If a match is found, the process may include registration actions associated with the SSID type. If no match is found, the process may include taking a set of actions defined to be the default actions.

A process for providing a WED differentiated actions depending on an SSID may begin when a WED detects SSID's in range. In one or more embodiments, the WED may prompt a user to select an SSID. If the WED has access to the cloud, or if the WED may access the cloud through the SSID, the process may then continue with a query to a registry.

If the registry determines that the SSID matches an SSID in the SSID database, the WED and SSID transmitter may take actions associated with the SSID. Otherwise, the WED and SSID transmitter may take actions defined to be the default actions for an SSID.

FIG. 1 shows System Architecture 100, which comprises Registry 102, Cloud 104, SSID Transmitter 106, and WED 108.

In one or more embodiments, Registry 102 may be a computing device storing a data set of SSIDs, SSID types, and SSID substrings associated with the SSID types. Registry 102 may be connected to Cloud 104, where Cloud 104 may be any suitable network infrastructure for allowing two or more computing devices to communicate.

SSID Transmitter 106 may be any device capable of transmitting wireless signal associated with an SSID, as well as communicating with one or more other devices connected to the wireless network associated with the SSID. In one or more embodiments, SSID Transmitter 106 may be configured to receive data through one or more networks.

WED 108 may be any computing device able to communicate with other devices wireless using any suitable wireless technology, including WiFi, Bluetooth, or LTE Direct, amongst others.

In one or more embodiments, SSID Transmitter 106 and WED 108 may be in range of each other's wireless signal and may communicate directly using one or more suitable wireless technologies. Additionally, SSID Transmitter 106 and WED 108 may be connected to Cloud 104 and may communicate with Registry 102.

Figure 2:
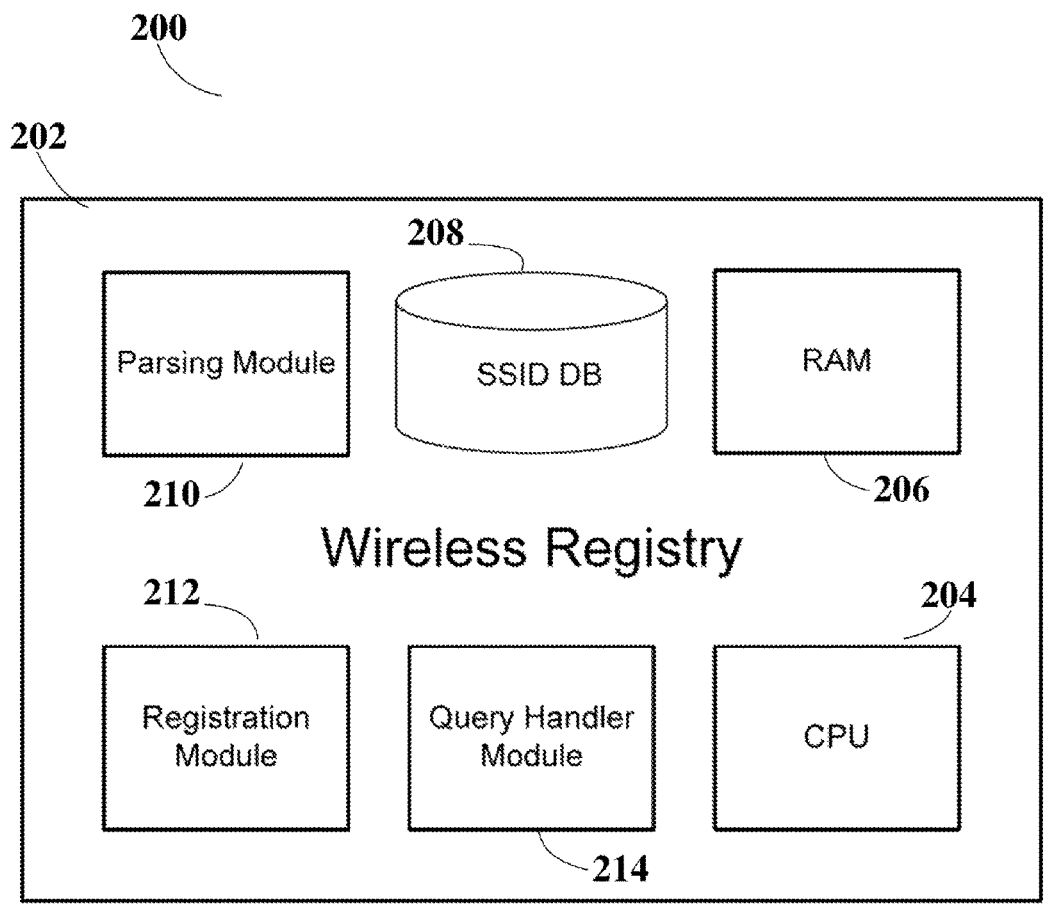
FIG. 2 shows a registry architecture, according to an embodiment.

FIG. 2 shows Registry Architecture 200, having Registry 202, Processor 204, RAM Unit 206, SSID Database 208, Parsing Module 210, Registration Module 212, and Query Handler Module 214.

In one or more embodiments, Registry 202 may be a computing device having a hardware configuration suitable for running any number of suitable modules, where the configuration includes at least one Processor 204 and at least one RAM Unit 206. In one or more embodiments, Registry 202 may additionally include network interfaces, physical storage, displays, and any other desired hardware components.

In one or more embodiments, Registry 202 includes an SSID Database 208 able to store a set of SSIDs, SSID types, and SSID substrings associated with the SSID types.

Parsing Module 210 may be a software module able to analyze an SSID string and determine if the SSID matches a type stored in SSID Database 208.

Registration Module 212 may be a software module able to determine how an SSID may be registered on an SSID Database 208.

Query Handler Module 214 may be a software module able to receive and handle a computing device's request for registering an SSID, verifying an SSID, retrieving actions associated with an SSID, or other otherwise accessing information associated with an SSID stored in SSID Database 208.

Figure 3:
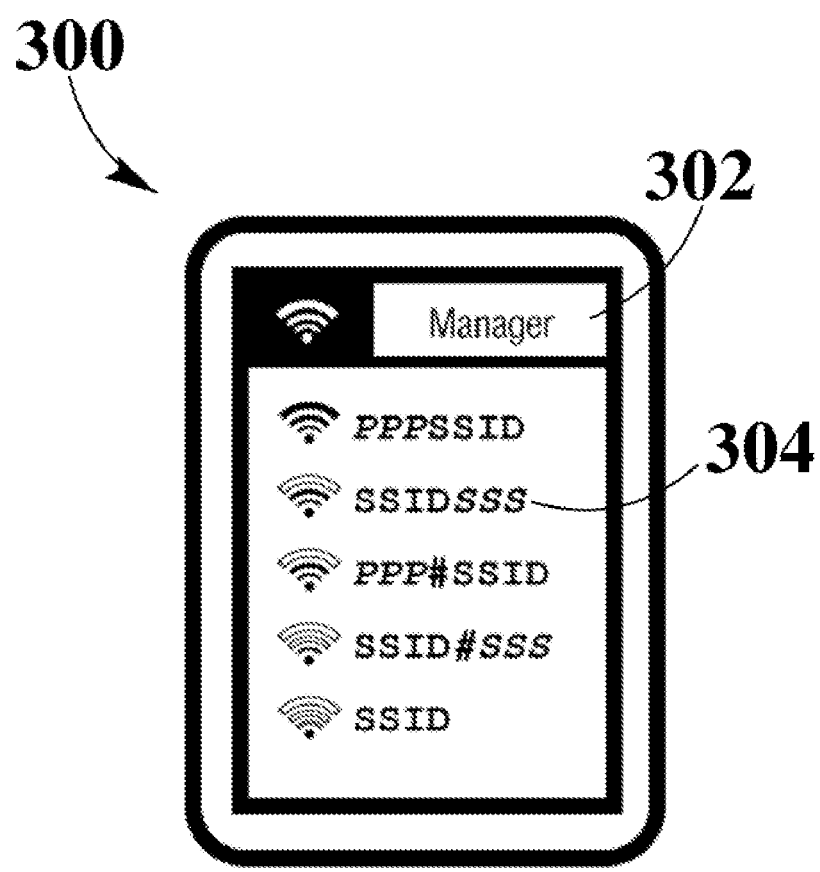
FIG. 3 shows a Wireless Enabled Device (WED), according to an embodiment.

FIG. 3 shows WED 300 displaying SSID Manager 302 and SSIDs 304.

WED 300 is shown displaying SSID Manager 302, where SSID Manager 302 is a user interface allowing a user to select an SSID 304 for a network to connect their WED 300. Although SSIDs 304 may be binary data wirelessly communicated between devices, the SSID Manager 302 shows various types of SSIDs 304 in a human-readable format for the user of the WED 300. In one or more embodiments, the SSIDs 304 may include a human-readable substring, such as a prefix or suffix. Suitable substrings may include alphanumeric strings, specially designated characters, or suitable combinations thereof.

Figure 4:
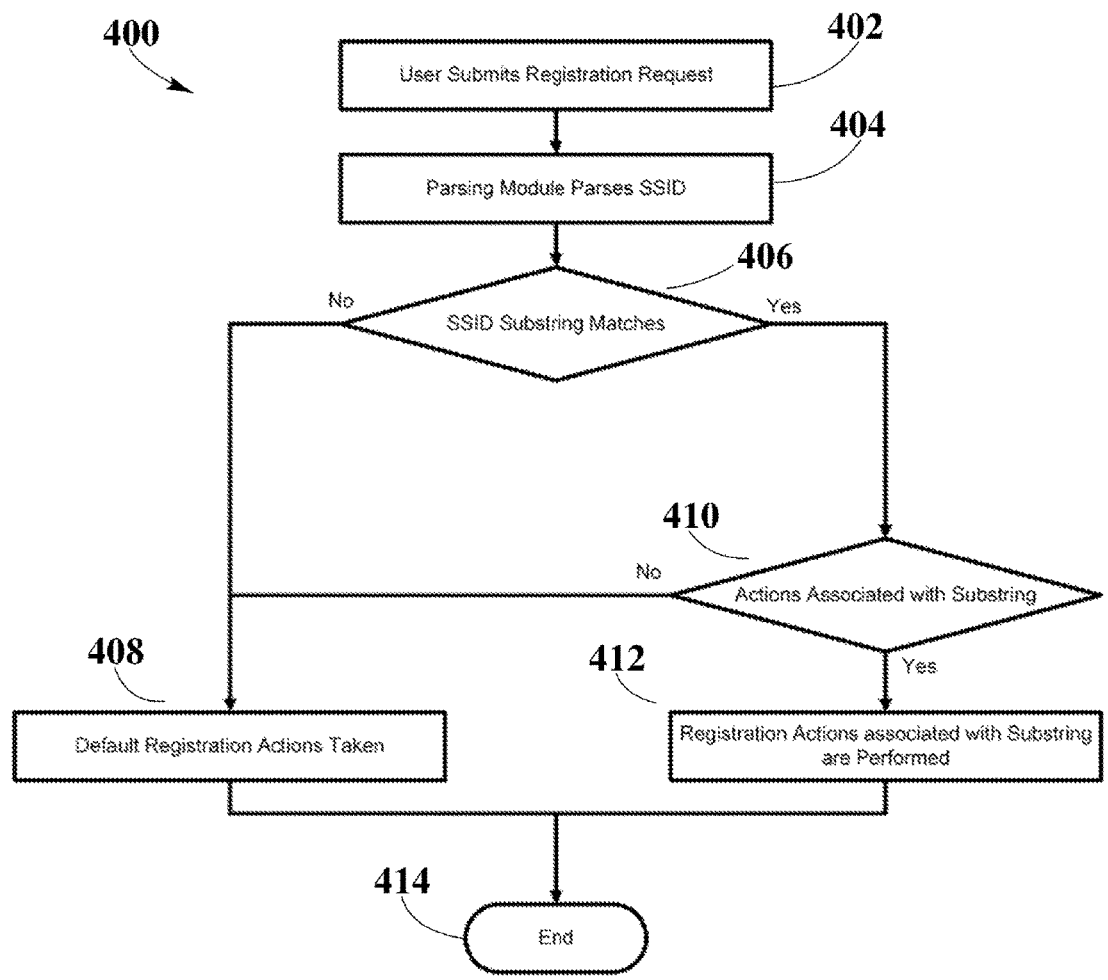
FIG. 4 is a registration flowchart, according to an embodiment.

FIG. 4 shows Registration Flowchart 400.

Registration begins with User Submits Registration Request 402. In this step, a user submits a request to register an SSID in a registry using a suitable computing device. In one or more embodiments, the request may be generated on a computing device connected the registry through a suitable network, including local area networks and the internet. The request may additionally include any suitable information required for the registration process, such as details about the user's identity, contact information, payment information, and geographic location, amongst others.

Once the registry has received the request, the process continues when Parsing Module Parses SSID 404. In this step, one or more parsing modules in the registry analyze the SSID and extract any substrings it is able to parse. In one or more embodiments, the parsing module may use algorithms for recognizing and extracting prefixes, suffixes, or suitable combinations.

The parsing module then determines if any SSID Substring Matches 406. In this step, the parsing module checks if any of the parsed substrings match a type of substring stored in an SSID database.

If no SSID substrings are found, or no SSID substrings match substrings in an SSID database, Default Registration Actions are Taken 408. In this step, a registration module may perform a default set of actions for registering an SSID that doesn't match any of the types defined in an SSID database. In one or more embodiments, this may include registering the SSID in the registry as a default type SSID and allowing information to be pinned to it, where suitable information may include text content, media content, links to content, or suitable combinations thereof. In other embodiments, the default registration actions may include denying the registration request.

If matching SSID substrings are found, the parsing module may instead proceed to perform check 410, to determine whether there are any Actions Associated with Substring. In this step 410, the parser checks if there are any actions associated with the type of substring found. If no actions are associated with the type of substring found, Default Registration actions are Taken 408.

If actions are associated with the type of substring found, Registration Actions associated with the Substring are Performed 412. In this step, the parsing module may send a set of instructions to the registration module including the actions associated with the type of SSID. The registration module may then proceed to perform the actions associated with the type of SSID. In one or more embodiments, this may include actions which may require interaction with one or more users or system administrators, such as verifying contact information, payment information, and identity information, amongst others. In one or more embodiments, the registration actions associated with a substring may include a set of default actions, a subset of default actions, or a superset of default actions. In one or more embodiments, the registration actions may include the approval or denial of a registration request.

Once the desired registration actions are taken, the process may End 414.

Taking Actions Associated with a Type of SSID

Establishing Connections Using SSIDs

Access Points may establish connections with Wireless Enabled Devices (WEDs) using suitable SSIDs, where SSIDs may require the use of a suitable credential, such as a key or password, to establish a connection with the Access Point. In some embodiments, the credentials may be associated with a private network, such as home or office networks. WEDs may store any suitable number of SSIDs in order to establish connections with previously accessed access points, and may attempt to connect to access points broadcasting these SSIDs automatically when in range.

Figure 5:
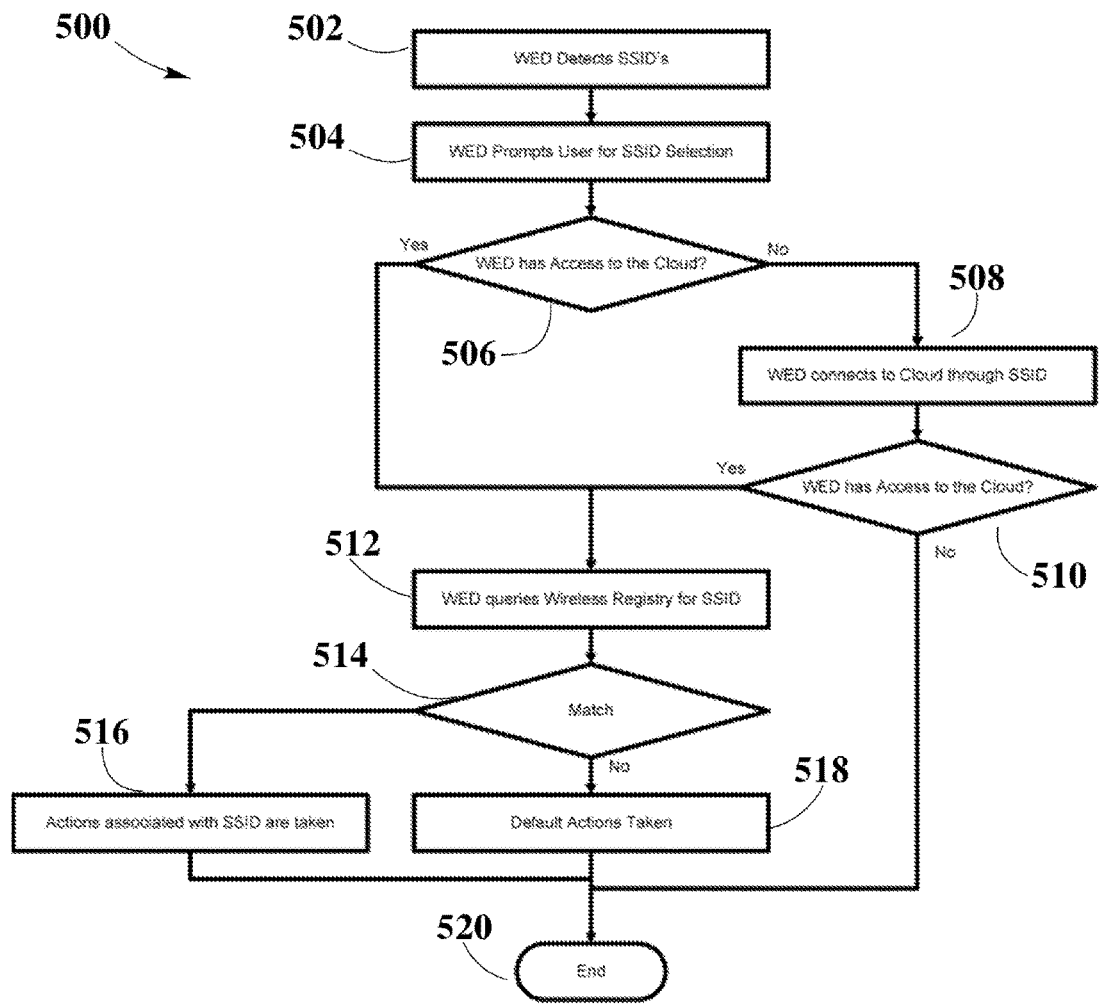
FIG. 5 is a WED action flowchart, according to an embodiment.

FIG. 5 shows WED Action Flowchart 500.

In a first step 502, the process may begin when WED Detects SSIDs. In this step 502, a WED checks if it is in range of any suitable wireless signals, where suitable wireless signals include SSIDs transmitted using a wireless technology the WED is able to use to communicate data.

In a next step 504, the process may then continue when the WED Prompts User for SSID Selection. In this step 504, a WED presents a user with a choice of connecting to one or more SSIDs in range of the WED. In one or more embodiments, the WED may present the choice automatically when the WED is in range of a newly recognized wireless signal. In other embodiments, the WED may present a list or other representation of the signals in range and may prompt the user to select an SSID to connect to when the user navigates to an interface showing the SSIDs in range.

In a next step 506, once the user has made a selection, the process may continue by checking if the WED has Access to the Cloud. In this step 506, the WED may use any suitable method for determining if it has access to the cloud, including pinging a registry.

In a next step 508, if the WED does not have access to the cloud, the process continues with WED connects to Cloud through SSID. In this step 508, the WED determined it did not have access to the cloud and attempts to connect to the cloud through the SSID chosen by the user.

In a next step 510, the process may continue by checking if WED has Access to the Cloud. In this step 510, the WED may use any suitable method for determining if it has access to the cloud, including pinging the registry.

In a next step 512, if it is determined that WED has access to the Cloud, the process may continue with WED queries Wireless Registry for SSID. In this step 512, software in the WED queries a registry for the SSID the user selected.

In a next step 514, software modules in the registry then determine if there is a match for the SSID queried by the WED in the registry.

If a match is returned from prior step 514, then in a next step 516, the process may continue with Actions associated with SSID are taken. In this step 516, the WED and SSID transmitter may take any actions associated with the SSID in the wireless registry. In one or more embodiments, the actions associated with the SSID may include the actions defined as default actions, a superset of the actions defined as default actions, and subsets of the actions defined as default actions. Suitable actions may additionally include verification of the WED, the SSID transmitter, making actions available to the user through the WED and the SSID transmitter, and actions taken by the SSID to display content on the WED, amongst others.

If there is no match returned from prior step 514, then in a next step 518, the process may continue with Default Actions Taken. In this step 518, the WED takes any actions defined to be performed when there is no match from the registry. In one or more embodiments, default actions may include: connecting to the internet using the network; allowing information to be pinned to it, including text content, media content, links to content, or suitable combinations thereof; allowing access to information pinned to the SSID, including text content, media content, links to content, or suitable combinations thereof; and other suitable actions.

In a next step 520, once the defined actions are taken, or if the WED is unable to connect to the cloud, the process may end.

Example #1 is a system that uses prefixes to differentiate between different types of SSIDs. In this example, a '$' symbol is used as a prefix for transmitters able to perform commercial transactions, a "+" symbol is used a prefix for registered personal networks, and '!' is used for registered information networks.

In this example, a user located in Grand Central Terminal in New York navigates to the wireless network manager in his WED. The WED then informs the user that the WED is in range of the following exemplary SSIDs:

SSID #1.) !NYMetroInformation
SSID #2.) $MetroTicketVending
SSID #3.) +JohnDoe

In this example, the user decides to connect to the $MetroTicketVending SSID. The user's WED is connected to the internet through an LTE connection and queries the Wireless Registry for the $MetroTicketVending SSID. The registry returns an authentication protocol and a link to an interface for interacting with the ticket vending machine. In this example, the registry additionally contains data associated with payment methods associated with the user's WED's MAC address, and the vending machine is able to process payments using this information.

In this example, the user decides to buy a metro ticket using the interface. The ticket vending machine and the WED proceed to perform a commercial transaction verification process, where information in the registry is used to verify that the WED and vending machine are in the proper geophysical locations, have the registered physical address (MAC address, IMEI, or other suitable identifier), and pass any other verification process desired by the user or vendor.

In this example, the user then retrieves the corresponding ticket from the vending machine and then navigates to the WED's wireless network manager. The user then connects to the !NYMetroInformation SSID. In this example, the !NYMetroInformation SSID shows pinned content, but does not allow new content to be pinned to it. The user uses the WED to navigate through the content to find a map of the station and locates boarding station for the subway the user wishes to ride. The user then saves the information, and navigates to the WED's wireless network manager once more.

In this example, the owner of the +JohnDoe SSID is an acquaintance of the user, and has registered the SSID in the registry. The user is authorized to read and pin content to the +JohnDoe SSID, and leaves a message as pinned content on the SSID.

Example #2 is a system that uses prefixes to differentiate between different types of SSIDs. In this example, a '$' symbol is used as a prefix for transmitters able to perform commercial transactions, a "+" symbol is used a prefix for registered personal networks, and '!' is used for registered information networks.

In this example, a user is attempting to register an SSID associated with commercial transactions, where the SSID is '$SodaVending'. The user submits a registration request through an internet based user interface, and is required to provide an ID, a business name, phone number, bank account, billing address, and geophysical location of the SSID transmitter. In this example, some information, such as the validity of the billing address is checked automatically, by a software module in the registry, while the other information presented must be verified manually. That is, an employee of the use or the registry service verifies that the information provided is valid, and the system proceeds to register the SSID in the registry. It should be appreciated, however, that all of the data may be automatically verified by a software module of the registry.

In this example, another user attempts to register "$JaneMorris" as an SSID, but does not intend to use it for commercial transactions. In this example, an employee determines that the SSID should not be registered and the request is turned down.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A computer-implemented method comprising:
    receiving, by a computer hosting a registry computing service, from a client device a request to register a first network identifier of a first wireless network, the first network identifier including a first substring indicating a network classification type for the first wireless network;
    parsing the first network identifier to extract substrings from the first network identifier;
    determining if a check on the substrings extracted from the first network identifier is satisfied, said check being satisfied if any of the substrings extracted from the first network identifier matches a stored type of substring;
    when said determining determines that said check is not satisfied, performing a default network identifier registration action including storing, by the computer, the first network identifier into a wireless registry that includes records of one or more other network identifiers; and
    when said determining determines that said check is satisfied, performing the default network identifier registration action when there is no action associated with a matching stored type of substring and performing an action associated with the matching stored type of substring when there is an action associated with the matching stored type of substring;

receiving, by the computer, a query including a wireless network identifier from a second client device;

determining, by the computer, if there is a match between the wireless network identifier included in the query and a stored network identifier included in said wireless registry;

performing, in response to determining that there is a match, an action associated in the wireless registry with the wireless network identifier that matches the wireless network identifier included in the query, said performing an action associated in the wireless registry with the wireless network identifier that matches the wireless network identifier included in the query including returning an authentication protocol and a link to an interface to the second client device; and wherein the interface is an interface of a machine, the method further comprising using information stored in the wireless registry to verify that the second client device and machine are in proper geophysical locations.

2. The method of claim 1, wherein said parsing extracts at least a prefix used to differentiate between different types of network identifiers.

3. The method of claim 2, wherein the different types of network identifiers includes one of a prefix used to identify a wireless network including a device capable of performing commercial transactions, a prefix used to identity personal networks, or a prefix used to identify an information network.

4. The method of claim 1,
wherein said machine is a vending machine and wherein said interface is an interface of the vending machine.

5. The method of claim 1, further comprising:
using information stored in the wireless registry to verify that the second client device and vending machine have MAC addresses which are registered with the wireless registry.

6. The method of claim 1, wherein a user of said client device from which the request to register a first network identifier of a first wireless network is received is required to provide an ID, a business name, phone number, bank account, billing address and geophysical location of a transmitter using the first network identifier; and
wherein the method further comprises:
operating the computer to automatically check the validity of the billing address provided by the user.

7. An apparatus comprising:
a computer hosting a registry service used to register wireless network identifiers, the computer including a processor and a memory coupled to the processor, said processor being configured to:
receive from a client device a request to register a first network identifier of a first wireless network, the first network identifier including a first substring indicating a network classification type for the first wireless network;
parse the first network identifier to extract substrings from the first network identifier;
determine if a check on the substrings extracted from the first network identifier is satisfied, said check being satisfied if any of the substrings extracted from the first network identifier matches a stored type of substring;
perform, in response to determining that said check is not satisfied, a default network identifier registration action including storing the first network identifier into a wireless registry that includes records of one or more other network identifiers;
perform, in response to determining that the check is satisfied, the default network identifier registration action when there is no action associated with a matching stored type of substring and perform an action associated with the matching stored type of substring when there is an action associated with the matching stored type of substring;
receive a query including a wireless network identifier from a second client device;
determine if there is a match between the wireless network identifier included in the query and a stored wireless network identifier included in said wireless registry;
perform, in response to determining that there is a match between the wireless network identifier included in the query, an action associated in the wireless registry with the wireless network identifier that matches the wireless network identifier included in the query, said step of performing an action associated in the wireless registry with the wireless network identifier that matches the wireless network identifier included in the query including returning an authentication protocol and a link to an interface to the second client device; and
wherein the interface is an interface of a machine, the processor being further configured to use information stored in the wireless registry to verify that the second client device and machine are in proper geophysical locations.

8. The apparatus of claim 7, wherein said parsing extracts at least a prefix used to differentiate between different types of network identifiers.

9. The apparatus of claim 8, wherein the different types of network identifiers includes one of a prefix used to identify a wireless network including a device capable of performing commercial transactions, a prefix used to identity personal networks, or a prefix used to identify an information network.

\* \* \* \* \*